(12) United States Patent
Tanaka (10) Patent No.: US 10,570,319 B2
(45) Date of Patent: *Feb. 25, 2020

(54) PRESSURE SENSITIVE ADHESIVE SHEET FOR TIRE

(71) Applicant: LINTEC Corporation, Itabashi-ku (JP)

(72) Inventor: Yoshikazu Tanaka, Kawaguchi (JP)

(73) Assignee: LINTEC Corporation, Itabashi-ku (JP)

(*) Notice: Subject to any disclaimer, the term of this patent is extended or adjusted under 35 U.S.C. 154(b) by 284 days.

This patent is subject to a terminal disclaimer.

(21) Appl. No.: 15/470,265

(22) Filed: Mar. 27, 2017

(65) Prior Publication Data

US 2017/0283660 A1 Oct. 5, 2017

(30) Foreign Application Priority Data

Mar. 31, 2016 (JP) .................. 2016-071813

(51) Int. Cl.
*C09J 7/38* (2018.01)
*C09J 7/40* (2018.01)
(Continued)

(52) U.S. Cl.
CPC ............... *C09J 7/38* (2018.01); *B32B 3/02* (2013.01); *B65C 3/00* (2013.01); *B65C 9/0006* (2013.01); *B65C 9/0015* (2013.01); *B65C 9/18* (2013.01); *B65C 9/24* (2013.01); *B65C 9/30* (2013.01); *C09J 7/21* (2018.01); *C09J 7/22* (2018.01);
(Continued)

(58) Field of Classification Search
None
See application file for complete search history.

(56) References Cited

U.S. PATENT DOCUMENTS 6,733,879 B2 5/2004 Ingerslew et al.
7,070,051 B2 * 7/2006 Kanner ............ A61B 17/06133
206/382

(Continued)

FOREIGN PATENT DOCUMENTS

EP 2 980 177 A1 2/2016
JP 2011-174986 A 9/2011
(Continued)

OTHER PUBLICATIONS

Extended European Search Report dated Aug. 22, 2017 in Patent Application No. 17163067.6.
(Continued)

*Primary Examiner* — Frank D Ducheneaux
(74) *Attorney, Agent, or Firm* — Oblon, McClelland, Maier & Neustadt, L.L.P.

(57) ABSTRACT

Provided is a pressure sensitive adhesive sheet for tires that enables continuous and efficient labeling on tires using a labeling apparatus. The pressure sensitive adhesive sheet includes a release material (C), a first pressure sensitive adhesive layer (B1), a first substrate (A1), a second pressure sensitive adhesive layer (B2), and a second substrate (A2), in this order, and satisfies Requirement (1): in a planar view of the pressure sensitive adhesive sheet, the outline of the first pressure sensitive adhesive layer (B1) exists inside the outline of the second substrate (A2); and Requirement (2): the MD stiffness of the second substrate (A2), measured in the Gurley method according to JIS L 1085, is 0.10 mN or more.

18 Claims, 3 Drawing Sheets

(51) Int. Cl.
*C09J 7/21* (2018.01)
*C09J 7/22* (2018.01)
*C09J 133/08* (2006.01)
*C09J 109/06* (2006.01)
*B65C 3/00* (2006.01)
*B65C 9/18* (2006.01)
*B65C 9/24* (2006.01)
*B65C 9/30* (2006.01)
*B32B 3/02* (2006.01)
*C09J 7/29* (2018.01)
*B65C 9/00* (2006.01)

(52) U.S. Cl.
CPC ............ *C09J 7/29* (2018.01); *C09J 7/385* (2018.01); *C09J 7/387* (2018.01); *C09J 7/40* (2018.01); *B32B 2250/05* (2013.01); *C09J 109/06* (2013.01); *C09J 133/08* (2013.01); *C09J 2201/162* (2013.01); *C09J 2201/606* (2013.01); *C09J 2201/61* (2013.01); *C09J 2203/334* (2013.01); *C09J 2400/283* (2013.01); *C09J 2423/005* (2013.01); *C09J 2423/046* (2013.01); *C09J 2425/00* (2013.01); *C09J 2425/006* (2013.01); *C09J 2427/005* (2013.01); *C09J 2433/00* (2013.01); *C09J 2453/00* (2013.01); *C09J 2467/006* (2013.01); *C09J 2477/006* (2013.01); *C09J 2483/005* (2013.01)

(56) References Cited

U.S. PATENT DOCUMENTS

| | | |
|---|---|---|
| 2008/0020203 A1 | 1/2008 | Tabata |
| 2009/0053477 A1 | 2/2009 | Werth et al. |
| 2015/0111017 A1* | 4/2015 | Hogerton ............... C09J 7/243 428/216 |
| 2017/0348947 A1* | 12/2017 | Cordova ............... B32B 27/32 |

FOREIGN PATENT DOCUMENTS

| | | |
|---|---|---|
| JP | 4915920 | 4/2012 |
| JP | 2014-201623 A | 10/2014 |

OTHER PUBLICATIONS

European Office Action dated Sep. 24, 2019, in European Patent Application No. 17163067.6 (5 pages).

* cited by examiner

PRESSURE SENSITIVE ADHESIVE SHEET FOR TIRE

CROSS REFERENCE TO RELATED APPLICATION

This application claims priority to Japanese Application Number 2016-071813, filed Mar. 31, 2016.

FIELD OF THE INVENTION

The present invention relates to a pressure sensitive adhesive sheet for tires, in particular to a pressure sensitive adhesive sheet for labeling tires with a labeling apparatus.

BACKGROUND OF THE INVENTION

Heretofore, pressure sensitive adhesive sheets for tires, called tire labels are known. Pressure sensitive adhesive sheets for tires describe the manufacturer's name or the brand name of the tire, the size (width, tire profile, rim ratio) and the price thereof, and precautions for use in order to transmit the tire information to customers, and are attached to the circumference including the tread surface of tires.

A pressure sensitive adhesive sheet for tire is generally so configured that a pressure sensitive adhesive layer of a rubber pressure sensitive adhesive or an acrylic pressure sensitive adhesive is laminated on a film support.

For example, Japanese Patent No. 4915920 discloses a pressure sensitive adhesive sheet for tires, containing a support and a pressure sensitive adhesive layer, wherein the pressure sensitive adhesive layer contains styrene/isoprene/styrene block copolymer.

SUMMARY OF THE INVENTION

In the case where such a pressure sensitive adhesive sheet for tires is stuck to a tire, heretofore the sheet is stuck thereto by hand, but these days, the sheets are automatically stuck to tires using a labeling apparatus.

However, Japanese Patent No. 4915920 does not describe a long continuum of labels necessary for sticking pressure sensitive adhesive sheets using a labeling apparatus, and nothing is investigated therein relating to a pressure sensitive adhesive sheet for tires suitable for use in the continuum of labels.

In fact, the present inventors tried producing a continuum of labels using the pressure sensitive adhesive sheet described in Japanese Patent No. 4915920, and sticking labels to tires using a labeling apparatus, but, in some cases, the pressure sensitive adhesive sheet could not be let out from the labeling apparatus (labeler) and could not be well stuck to tires.

In addition, a pressure sensitive adhesive sheet for tires is, as a tire label, to stuck to a non-flat surface with many asperities of a tire surface, and therefore for the purpose of improving the ability of the pressure sensitive adhesive to be well embedded in the tire surface, a soft pressure sensitive adhesive composition is used and the coating thickness of the pressure sensitive adhesive is increased.

Consequently, in a series of label-processing steps of die cutting and stripping to give a pressure sensitive adhesive sheet for tires, the resultant sheet is wound up as a roll, and when pressure or heat is given to the labels, the pressure sensitive adhesive composition may ooze out from the edges of the labels, and there may occur a problem that the thus-oozing pressure sensitive adhesive composition may adhere to the back surface of the release sheet of the other pressure sensitive adhesive sheet put thereon.

As a result, in the labeling operation using a labeling apparatus, there may occur a running failure of the continuum of labels, or as the case may be, a pressure sensitive adhesive composition may stick to the labeling apparatus to cause labeling operation failure.

The present invention has been made in consideration of the current condition as above, and its object is to provide a pressure sensitive adhesive sheet for tires capable of being used for continuously and efficiently sticking labels onto tires using a labeling apparatus.

As a result of assiduous studies, the present inventors have found that a pressure sensitive adhesive sheet for tires, including a release material (C), a first pressure sensitive adhesive layer (B1), a first substrate (A1), a second pressure sensitive adhesive layer (B2), and a second substrate (A2), in this order, wherein the relationship between the second substrate (A2) and the first pressure sensitive adhesive layer (B1), and the relationship between the second substrate (A2) and the second pressure sensitive adhesive layer (B2) each satisfy specific requirements, can solve the above-mentioned problems, and have completed the present invention.

Specifically, the present invention provides the following [1] to [5].

[1] A pressure sensitive adhesive sheet for tires, including a release material (C), a first pressure sensitive adhesive layer (B1), a first substrate (A1), a second pressure sensitive adhesive layer (B2), and a second substrate (A2), in this order; and satisfying the following requirements (1) and (2):

Requirement (1): in a planar view of the pressure sensitive adhesive sheet for tires, the outline of the first pressure sensitive adhesive layer (B1) exists inside the outline of the second substrate (A2); and Requirement (2): the MD stiffness of the second substrate (A2), measured in the Gurley method according to JIS L 1085, is 0.10 mN or more.

[2] The pressure sensitive adhesive sheet for tires according to the above [1], satisfying the following requirement (3):

Requirement (3): the minimum height h1 that is the shortest distance from the edge of the surface on the opposite side to the second substrate (A2) of the second pressure sensitive adhesive layer (B2) to the release material (C) is more than 0 mm.

[3] The pressure sensitive adhesive sheet for tires according to the above [1] or [2], wherein the first pressure sensitive adhesive layer (B1) is formed of a hot-melt pressure sensitive adhesive composition.

[4] The pressure sensitive adhesive sheet for tires according to the above [3], wherein the hot-melt pressure sensitive adhesive composition is one prepared by blending 15 to 40% by mass of a block copolymer, 30 to 70% by mass of a tackifier, and 10 to 40% by mass of a plasticizer.

According to the present invention, there can be provided a pressure sensitive adhesive sheet for tires capable of being used for continuously and efficiently sticking labels onto tires using a labeling apparatus.

DETAILED DESCRIPTION OF THE INVENTION

[Pressure Sensitive Adhesive Sheet for Tires]

The pressure sensitive adhesive sheet for tires of the present invention is a pressure sensitive adhesive sheet for tires, which includes a release material (C), a first pressure sensitive adhesive layer (B1), a first substrate (A1), a second pressure sensitive adhesive layer (B2), and a second substrate (A2), in this order, and satisfying the following requirements (1) and (2):

Requirement (1): In a planar view of the pressure sensitive adhesive sheet for tires, the outline of the first pressure sensitive adhesive layer (B1) exists inside the outline of the second substrate (A2); and Requirement (2): The MD stiffness of the second substrate (A2), measured in the Gurley method according to JIS L 1085, is 0.10 mN or more.

One example of the pressure sensitive adhesive sheet for tires of the present invention is described with reference to FIG. 1, but so far as it exhibits the advantageous effects of the present invention, the pressure sensitive adhesive sheet for tires of the present invention is not limited to the following example.

Figure 1:
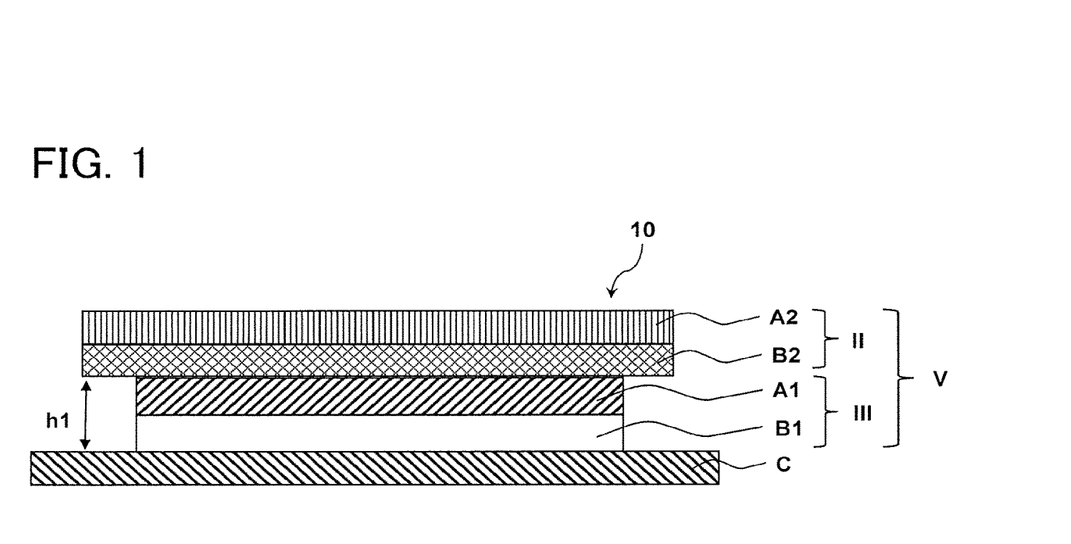
FIG. 1 is a schematic cross-sectional view showing one example of a configuration of a pressure sensitive adhesive sheet for tires of the present invention.

FIG. 1 is a schematic cross-sectional view showing one example of a configuration of the pressure sensitive adhesive sheet for tires of the present invention. As shown in FIG. 1, the pressure sensitive adhesive sheet 10 for tires has, on the surface of a release material (C), a first pressure sensitive adhesive layer (B1), a first substrate (A1), a second pressure sensitive adhesive layer (B2), and a second substrate (A2), in this order. The layers of the first pressure sensitive adhesive layer (B1), the first substrate (A1), the second pressure sensitive adhesive layer (B2), and the second substrate (A2) in FIG. 1 form a laminate (V) to be described hereinunder.

Figure 4:
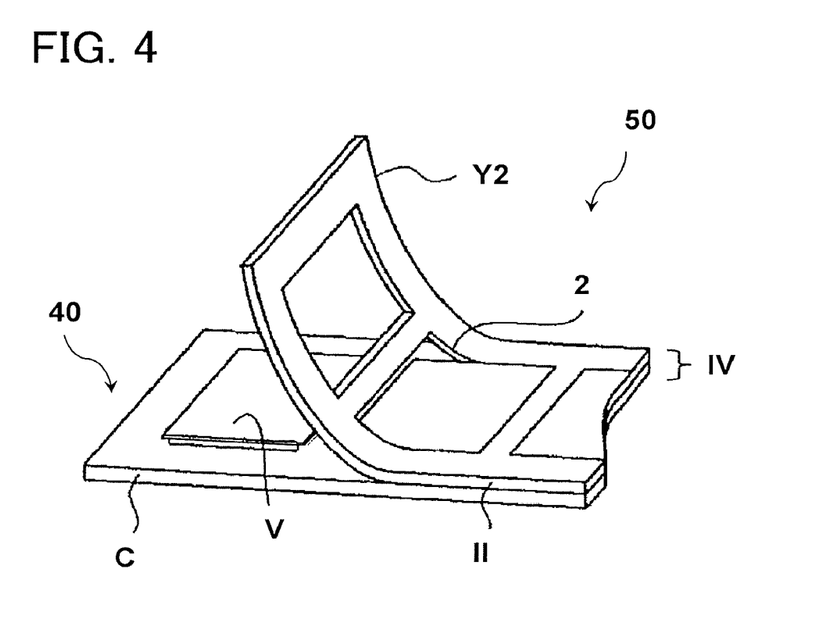
FIG. 4 is a schematic perspective view of a pressure sensitive adhesive sheet for tires after die cutting, for explaining a selvage part (Y2) and a laminate (V) to form during producing a continuum of labels.

In the following, a mere wording "label" is meant to indicate a part except the release material (C) and a selvage part (Y2) among the continuum of labels produced using the pressure sensitive adhesive sheet for tires of the present invention, for example, as shown in FIG. 4, that is, the wording indicates the laminate (V).

<Requirement (1) and Requirement (2)>

The pressure sensitive adhesive sheet for tires of the present invention is a pressure sensitive adhesive sheet for tires satisfying the following requirements (1) and (2).

Requirement (1): In a planar view of the pressure sensitive adhesive sheet for tires, the outline of the first pressure sensitive adhesive layer (B1) exists inside the outline of the second substrate (A2).

Requirement (2): The MD stiffness of the second substrate (A2), measured in the Gurley method according to JIS L 1085, is 0.10 mN or more.

The requirement (1) is described with reference to FIG. 2. Like in FIG. 1, the pressure sensitive adhesive sheet for tires of the present invention is not limited to the example shown in FIG. 2 so far as it exhibits the advantageous effects of the present invention.

Figure 2:
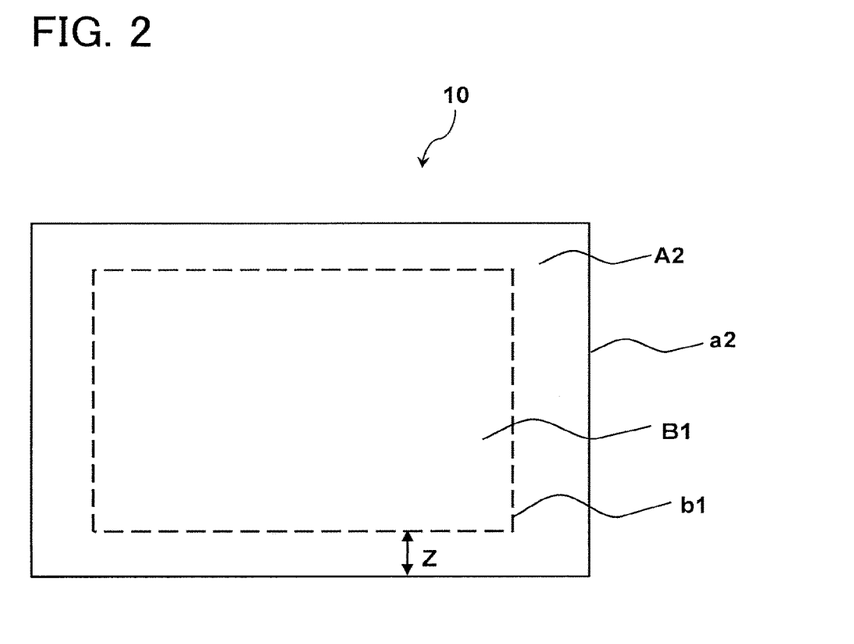
FIG. 2 is a schematic plan view in the case where one example of a configuration of a pressure sensitive adhesive sheet for tires of the present invention is observed in a vertical direction from the side of the second substrate (A2) relative to the surface of the pressure sensitive adhesive sheet for tires.

FIG. 2 is a schematic view of a case of observing the pressure sensitive adhesive sheet 10 for tires in the vertical direction thereof from the side of the second substrate (A2) thereof relative to the surface of the sheet (hereinafter this may be simply referred to as "a planar view"). In this description, the release material (C), the first substrate (A1) and the second pressure sensitive adhesive layer (B2) are omitted on FIG. 2. In the case where the second substrate (A2) is a nontransparent substrate, the outline of the first pressure sensitive adhesive layer (B1) shown by the broken line is lower than the second substrate (A2) as shown in FIG. 1, and therefore cannot be confirmed visually. Here, for explanation, the position of the outline is shown by the broken line.

The solid line a2 shown in FIG. 2 means the outline of the second substrate (A2), and the broken line b1 means the outline of the first pressure sensitive adhesive layer (B1).

As shown in FIG. 2, in the pressure sensitive adhesive sheet 10 for tires of the present invention, when the sheet 10 is seen in a planar view thereof, the outline b1 of the first pressure sensitive adhesive layer (B1) exists inside the outline a2 of the second substrate (A2).

In the case where the requirement (1) is not satisfied, the pressure sensitive adhesive composition derived from the first pressure sensitive adhesive layer (B1) may ooze out from the outline (edge) of the second substrate (A2). As described above, in a pressure sensitive adhesive sheet for tires, a relatively soft, pressure sensitive adhesive composition is used for the first pressure sensitive adhesive layer (B1) and the pressure sensitive adhesive layer is thick in many cases, and therefore, when the requirement (1) is not satisfied in the case, the pressure sensitive adhesive composition derived from the oozing, first pressure sensitive adhesive layer (B1) may stick to the surface on the opposite side to the label of the release material (C) (the back surface of the release material (C)) of the pressure sensitive adhesive sheet for tires.

Regarding the requirement (2), the MD stiffness of the second substrate (A2), measured in the Gurley method according to JIS L 1085, is 0.10 mN or more.

If the MD stiffness of the second substrate (A2) is less than 0.10 mN, and when the release material (C) is folded along a peel plate part, the label may follow the release material to bend, therefore failing in edge peeling. From this viewpoint, the MD stiffness of the second substrate (A2) is preferably 0.15 mN or more, more preferably 0.18 mN or more, even more preferably 0.20 mN or more.

On the other hand, from the viewpoint that, by controlling the MD stiffness of the second substrate (A2) so as not to be too high, the label flexibility is improved and the followability of the label to a tire as an adherend is thereby improved to make the label hardly peelable, the MD stiffness is preferably 0.40 mN or less, more preferably 0.35 mN or less, even more preferably 0.30 mN or less.

In the case where the requirements (1) and (2) are not satisfied, there may occur labeling failure in labeling with a labeling apparatus, owing to adhering of the pressure sensitive adhesive composition and reduction in label edge peeling.

Here, "edge peeling" means that, when a continuum of labels produced using a pressure sensitive adhesive sheet for tires is made to run forward in a labeling apparatus, and when the release material (C) is folded in the peel plate part, the label is not bend but is peeled from the release material (C) to thereby form an initial label peeling part (a trigger for peeling).

These failures may cause label edge peeling failure in sticking using a labeling apparatus, or failure in the forwarding operation, owing to an adhesion of the pressure sensitive adhesive composition to the labeling apparatus.

Accordingly, since the pressure sensitive adhesive sheet for tires of the present invention satisfies these requirements (1) and (2), the pressure sensitive adhesive composition derive from the second pressure sensitive adhesive layer (B2) can be prevented from adhering to the release material (C) and can also be prevented from directly or indirectly adhering to the labeling apparatus, and additionally, the pressure sensitive adhesive composition can effectively act for label edge peeling, and for these reasons, the pressure sensitive adhesive sheet for tires of the present invention is effective for continuously and efficiently sticking labels to tires using a labeling apparatus.

In a planar view of the pressure sensitive adhesive sheet for tires, the configuration of the pressure sensitive adhesive sheet is not specifically limited so far as the outline of the first pressure sensitive adhesive layer (B1) exists inside the outline of the second substrate (A2), but, the shortest distance (Z) between the outline a2 of the second substrate (A2) and the outline b1 of the first pressure sensitive adhesive layer (B1) is preferably 0.10 mm or more, more preferably 0.20 mm or more, even more preferably 0.50 mm or more. The upper limit of the distance is, though not specifically limited thereto, preferably 10.00 mm or less, more preferably 5.00 mm or less, even more preferably 3.00 mm or less, still more preferably 2.00 mm or less.

The reference sign Z on FIG. 2 represents the shortest distance (Z) between the outline a2 of the second substrate (A2) and the outline b1 of the first pressure sensitive adhesive layer (B1).

Here, the shortest distance (Z) differs from the shortest distance between the outline a2 and the outline b1 in the case where the outline b1 exist outside the outline a2. That is, since the pressure sensitive adhesive sheet for tires of one aspect of the present invention satisfies the requirement (1), the shortest distance (Z) indicates the shortest distance between the outline a2 and the outline b1 in the case where the outline b1 exists inside the outline a2. Consequently, a larger value of the shortest distance (Z) means that the outline b1 exists more inside the outline a2.

Though not specifically limited, in a planar view of the pressure sensitive adhesive sheet for tires, it is preferable that the outline of the first pressure sensitive adhesive layer (B1) exists inside the outline of the second pressure sensitive adhesive layer (B2), and the outline of the second substrate (A2) may be the same as the outline of the second pressure sensitive adhesive layer (B2).

<Requirement (3)>

Preferably, the pressure sensitive adhesive sheet for tires of the present invention satisfies the following requirement (3).

Requirement (3): The minimum height h1 that is the shortest distance from the edge of the surface on the opposite side to the second substrate (A2) of the second pressure sensitive adhesive layer (B2) to the release material (C) is more than 0 mm.

The requirement (3) is described with reference to FIG. 1.

FIG. 1 is a schematic cross-sectional view showing one example of a configuration of a pressure sensitive adhesive sheet for tires of the present invention, and the reference sign h1 on FIG. 1 represents the shortest distance from the edge of the surface of the second pressure sensitive adhesive layer (B2) that is on the opposite side to the second substrate (A2) to the release material (C).

The value h1 is more than 0 mm, that is, the edge of the surface of the second pressure sensitive adhesive layer (B2) on the opposite side to the second substrate (A2) is not kept in contact with the surface on the side of the first pressure sensitive adhesive layer (B1) of the release material (C), and consequently, the pressure sensitive adhesive composition of the second pressure sensitive adhesive layer (B2) can be prevented from adhering to the surface on the first pressure sensitive adhesive layer (B1) of the release material (C), therefore preventing edge peeling failure that may be caused by the adhering.

From this viewpoint, the shortest distance h1 is preferably 0.03 mm or more, more preferably 0.04 mm or more, even more preferably 0.05 mm or more. The upper limit is, though not specifically limited thereto, preferably 2.00 mm or less, more preferably 1.00 mm or less.

The constituent components of the pressure sensitive adhesive sheet for tires of the present invention are described below.

<First Substrate (A1)>

The first substrate (A1) that the pressure sensitive adhesive sheet for tires of the present invention has may be, though not specifically limited thereto, suitably selected from known substrates.

Examples of the substrate include, though not specifically limited thereto, polyester films of polyethylene terephthalate, polybutylene terephthalate, polyethylene naphthalate, etc.; polyethylene films, polypropylene films, cellophane, diacetyl cellulose films, triacetyl cellulose films, acetyl cellulose butyrate films, polyvinyl chloride films, polyvinylidene chloride films, polyvinyl alcohol films, ethylene-vinyl acetate copolymer films, polystyrene films, polycarbonate films, polymethylpentene films, polysulfone films, polyether ether ketone films, polyether sulfone films, polyether imide films, polyimide films, fluororesin films, polyamide films, acrylic resin films, norbornene resin films, cycloolefin films, etc.

For the purpose of improving the adhesiveness to the pressure sensitive adhesive layer (B1) and the pressure sensitive adhesive layer (B2) to be provided thereon, the first substrate (A1) may be surface-treated according to an oxidation method or a surface roughening method, or a primer layer may be formed thereon.

Examples of the oxidation method include corona discharge treatment, chromate treatment (wet-method), flame treatment, hot air treatment, ozone/UV irradiation and the like; and examples of the surface roughening method include a sand blasting method, a solvent treatment method, etc. These surface treatment methods may be suitably selected depending on the type of the substrate film, but in general, a corona discharge treatment method is favorably employed from the viewpoint of the effect and the operability thereof.

Examples of the material for the primer layer include a polyester resin, a urethane resin, etc.

The thickness of the first substrate (A1) is, though not specifically limited thereto, preferably 5 to 50 μm, more preferably 6 to 38 μm, even more preferably 12 to 30 μm.

<Second Substrate (A2)>

The second substrate (A2) included in the pressure sensitive adhesive sheet for tires of the present invention may be any one with no specific limitation so far as the MD stiffness thereof, measured according to the Gurley method according to JIS L 1085, is 0.10 mN or more. Preferred examples of the pressure sensitive adhesive sheet include papers such as wood-free paper, glassine paper, coated paper, cast-coated paper, dust-free paper etc.; laminated papers prepared by laminating these papers with a thermoplastic resin such as polyethylene, etc.; resin films formed of, for example, a thermoplastic resin such as polyethylene, polypropylene, polyethylene terephthalate, polybutylene terephthalate, polyethylene naphthalate, polystyrene, nylon, etc.; one-layer or two- or more multi-layer synthetic papers formed by melt mixing a synthetic resin, a filler and an additive and then extruding the resultant mixture, and having inner voids; paper, metal film and composite of these; etc. Among these, use of resin films or synthetic papers is preferred since they have excellent mechanical strength and can effectively prevent breakage of supports in label peeling.

The preferred range of the MD stiffness measured according to the Gurley method according to JIS L 1085 of the second substrate (A2) is as described above.

The thickness of the second substrate (A2) is not specifically limited so far as it does not detract from the advantageous effects of the present invention, but from the viewpoint that the pressure sensitive adhesive sheet for tires is easier to handle, that the pressure sensitive adhesive sheet is hardly wrinkled in label sticking, and that the second substrate (A2) is hardly broken in label peeling, the thickness is preferably 10 μm or more, more preferably 15 μm or more, even more preferably 25 μm or more, still more preferably 35 μm or more.

On the other hand, the thickness of the second substrate (A2) is, from the viewpoint that the flexibility of the label is improved, that the followability thereof to a tire being an adherend is improved and that the label hardly peels away, preferably 150 μm or less, more preferably 120 μm or less, even more preferably 100 μm or less.

More preferably, the second substrate (A2) is provided with a metal layer (D) such as an aluminum vapor-deposition layer, etc. By using a substrate having such a configuration, and by laminating the metal layer in such a manner that the metal layer faces the side of the second pressure sensitive adhesive layer (B2), the surface of the second substrate (A2) can be effectively prevented from blackening owing to migration of the tire constituent components thereto. More concretely, an amine-type antiaging agent, an aromatic oil and the like that are the constituent components of rubber material to constitute tires can be prevented from moving to the second substrate (A2) to blacken the surface of the second substrate (A2).

Further, as the second substrate (A2), one provided with a primer layer for facilitating label printing to be mentioned below, or a recording layer for enabling recording such as thermal transfer recording, inkjet recording or the like, or one having an overcoat film or an overlaminate film for protecting the surface of those layers is preferred. Further, a second substrate (A2) prepared by providing an information region for magnetic recording, barcoding, microsemiconductor elements or the like in a part of the second substrate (A2) is also employable.

<First Pressure Sensitive Adhesive Layer (B1)>

The first pressure sensitive adhesive layer (B1) included in the pressure sensitive adhesive sheet for tires of the present invention is not specifically limited so far as it falls within a range not detracting from the advantageous effects of the present invention, but any pressure sensitive adhesive layer formed of a known pressure sensitive adhesive composition that is known as a material for general pressure sensitive adhesive layers may be suitably selected and used. Among these, one formed of a hot-melt pressure sensitive adhesive composition is preferred. Here, the hot-melt pressure sensitive adhesive means a pressure sensitive adhesive of a type that can melt by heating to be spreadable and coatable and can exhibit pressure sensitive adhesiveness and cohesion by cooling.

As the hot-melt pressure sensitive adhesive composition, one prepared by mixing a block copolymer, a tackifier, and a plasticizer in a given ratio can be used.

(Block Copolymer)

The block copolymer includes AB-type diblock copolymers such as a styrene/isobutylene block copolymer (SIB), a styrene/butadiene block copolymer (SB), a styrene/isoprene block copolymer (SI), etc.; ABA-type triblock copolymers such as a styrene/isobutylene/styrene block copolymer (SIBS), a styrene/butadiene/styrene block copolymer (SBS), a styrene/isoprene/styrene block copolymer (SIS), etc. One of them may be used singly, or two or more thereof may be used in combination.

Among these, use of an ABA-type triblock copolymer is preferred in terms of easily imparting tackiness, and use of a styrene/isoprene/styrene block copolymer (SIS) is more preferred.

The amount of the block copolymer to be used is preferably 5 to 40% by mass relative to 100% by mass of the total amount of the pressure sensitive adhesive composition, more preferably 18 to 30% by mass.

When the amount of the block copolymer added is a value of 15% by mass or more, the cohesion of the entire pressure sensitive adhesive increases and in a summer season where the ambient temperature is high, significant characteristic degradation can be prevented, oozing from the cut face of the pressure sensitive adhesive sheet (hereinafter this may be referred to as "oozing") can be prevented, and further the die-cutting property can be prevented from worsening. On the other hand, when the amount of the block copolymer added is 40% by mass or less, the adhesive strength to an adherend increases to secure strong adhesion, and in particular, sticking in a low-temperature environment is bettered. In addition, the melt viscosity of the entire pressure sensitive adhesive increases to prevent the hot-melt coating aptitude of the pressure sensitive adhesive from lowering.

As the block copolymer, using an ABA-type triblock copolymer along with an AB-type diblock copolymer is preferred. The amount of the diblock copolymer to be added is preferably 30 to 80% by mass of the triblock copolymer. When the amount of the diblock copolymer added is 30% by mass or more, the addition effect can be obtained, and when the amount of the diblock copolymer added is 80% by mass or less, the cohesion does not lower and oozing or paste remaining after label peeling can be prevented.

In the case where the ABA-type triblock copolymer is a styrene/isoprene/styrene block copolymer (SIS), a styrene/isoprene block copolymer (SI) of the same sort is preferably used as the AB-type diblock copolymer to be combined.

In the case where one having a polystyrene region (a part corresponding to a styrene-derived repeating unit) is used as the block copolymer, the content of the polystyrene region is, from the viewpoint of adhesiveness, hot-melt coating aptitude, etc., preferably 10 to 20% by mass in the block copolymer.

(Tackifier)

The tackifier is not specifically limited, and any conventional known ones are usable. For example, there are mentioned rosin-type resins such as polymerized rosins, polymerized rosin esters, rosin derivatives, etc.; terpene-type resins such as polyterpene resins, aromatic-modified terpene resins and hydrides thereof, terpene-phenol resins, etc.; chromane-indene resins; petroleum resins such as aliphatic petroleum resins, aromatic petroleum resins and hydrides thereof, aliphatic/aromatic copolymer petroleum resins, etc.; low-molecular weight polymers of styrene or substituted styrenes; etc.

One of them may be used singly, or two or more thereof may be used in combination.

The hot-melt pressure sensitive adhesive composition preferably includes plural tackifiers respectively differing in point of the softening point among them. When two or more types of tackifiers each having a different softening point are used, they can be selectively dissolved in the rubber component in the block copolymer or in the resin component.

More preferably, the hot-melt pressure sensitive adhesive composition includes at least one kind of a tackifier having a softening point, as measured according to JIS K 2207, of 60 to 100° C. and at least one kind of a tackifier having a softening point of 120° C. or higher.

The tackifier having a softening point of 120° C. or higher is effective for expressing pressure sensitive adhesiveness at a high temperature, but the pressure sensitive adhesiveness may lower at a low temperature. Consequently, when combined with a tackifier having a softening point of 60 to 100° C., the pressure sensitive adhesiveness can be specifically improved from a low-temperature region to a normal-temperature region, and control of adhesive strength and cohesion is easy in a broad temperature range covering a low-temperature region to a high-temperature region.

As the tackifier having a softening point of 120° C. or higher, a polymerized rosin ester is preferred; and as the tackifier having a softening point of 60 to 100° C., an aromatic-modified terpene resin, a terpene-phenol resin, an aliphatic petroleum resin, an aromatic petroleum resin and an aliphatic/aromatic petroleum resin are preferred. The former is readily selectively miscible with a rubber component, and the latter is readily selectively miscible in a block copolymer, and therefore the two form a preferred combination as a tackifier.

By varying the amount of the polymerized rosin ester to be added, for example, within a range of 0 to 18% by mass, the adhesive strength to an adherend at a different temperature and the curved-surface attachability and the holding power can be varied.

In the case where a tackifier having a softening point of 120° C. or higher and a tackifier having a softening point of 60 to 100° C. are used as combined, the amount of the polymerized rosin ester to be used relative to 100% by mass of the entire amount of the tackifier is preferably 5 to 25% by mass, more preferably 10 to 25% by mass. When the amount of the polymerized rosin ester to be used is controlled in that manner, the curved-surface attachability and the adhesive strength are not lowered greatly.

The amount of the tackifier to be added is preferably 30 to 70% by mass relative to the entire amount, 100% by mass of the pressure sensitive adhesive composition, more preferably 40 to 65% by mass. When the amount of the tackifier added is 30% by mass or more, a sufficient adhesive strength can be produced, and the sheet can firmly adhere to tires, etc in sticking the sheet to tires, etc.

On the other hand, when the amount of the tackifier added is 70% by mass or less, oozing can be prevented and the adhesive-cutting property in label die cutting can be prevented from worsening.

(Plasticizer)

The plasticizer is not specifically limited, and any conventional known ones are employable. For example, there are mentioned petroleum process oils such as paraffin process oils, naphthene process oils, aromatic process oils, etc.; natural oils such as castor oil, tall oil, etc.; dibasic acid dialkyl esters such as dibutyl phthalate, dioctyl phthalate, dibutyl adipate, etc.; low-molecular-weight liquid polymers such as liquid polybutene, liquid polyisoprene, etc.

Among these, paraffin process oils are preferred as especially stable to heat and UV rays, and capable of producing pressure sensitive adhesive compositions excellent in coloration.

Combined use of a paraffin process oil and any other plasticizer is possible. In this case, preferably, the paraffin process oil is used in an amount of 60% by mass or more relative to the total amount, 100% by mass of the plasticizer.

The amount of the plasticizer to be added is preferably 10 to 40% by mass relative to the total amount, 100% by mass of the pressure sensitive adhesive composition, more preferably 15 to 30% by mass. When the amount of the plasticizer added is 10% by mass or more, the composition can be sufficiently plasticized to exhibit a sufficient adhesive strength, and when stuck to tires or the like, the composition can firmly adhere thereto.

On the other hand, when the amount of the plasticizer added is 40% by mass or less, oozing can be prevented, and the adhesive-cutting property in label die cutting can be prevented from worsening.

In the case where a pressure sensitive adhesive composition which is prepared by blending a block copolymer, a tackifier and a plasticizer as mentioned above, is used, the adhesive strength of the resultant pressure sensitive adhesive composition to adherends at different temperatures can be readily controlled. In the case where the composition is used for a pressure sensitive adhesive sheet for tires, the sheet lifts or peels little even when it is stuck to a winter tire as an adherend in a winter season where the ambient temperature is low, and the sheet can be stuck thereto with high accuracy. In addition, even in a summer season where the ambient temperature is high, there occurs no problem of lifting or peeling after sticking, and further, when the pressure sensitive adhesive layer is laminated, it is unnecessary to use a solvent and to dry the layer, and accordingly, the production apparatus can be down-sized and the production time can be shortened.

The thickness of the first pressure sensitive adhesive layer (B1) is not specifically limited, but is preferably 10 to 100 μm, more preferably 20 to 80 μm, even more preferably 30 to 60 μm.

When the thickness falls within the range, the pressure sensitive adhesiveness of the label to tries may be sufficient, and a probability of failures in printing or die cutting the pressure sensitive adhesive sheet for tires may be reduced.

<Second Pressure Sensitive Adhesive Layer (B2)>

The second pressure sensitive adhesive layer (B2) included in the pressure sensitive adhesive sheet for tires of the present invention in not specifically limited within a range not detracting from the advantageous effects of the present invention, and a pressure sensitive adhesive layer formed of a known pressure sensitive adhesive composition that is known as a material for general pressure sensitive adhesive layers may be suitably selected and used as the second pressure sensitive adhesive layer (B2).

The pressure sensitive adhesive to constitute the pressure sensitive adhesive composition is not specifically limited so far as it falls within a range not detracting from the advantageous effects of the present invention, and examples thereof include acrylic pressure sensitive adhesives, urethane pressure sensitive adhesives, silicone pressure sensitive adhesives, rubber pressure sensitive adhesives, polyester pressure sensitive adhesives, etc.

One of these pressure sensitive adhesives may be used singly, or two or more thereof may be used in combination.

As the pressure sensitive adhesive, an acrylic pressure sensitive adhesive is preferred.

(Acrylic Pressure Sensitive Adhesive)

As the acrylic pressure sensitive adhesive, any suitable acrylic resin is usable.

The acrylic resin is not specifically limited, and a (meth)acrylate copolymer is preferred.

The (meth)acrylate copolymer is preferably a copolymer of a (meth)acrylate in which the alkyl group in the ester moiety has 1 to 18 carbon atoms and, as optional components, a crosslinking functional group-containing ethylenic monomer and any other monomer.

In this description, (meth)acrylate means an acrylate or a methacrylate; (meth)acrylic acid means an acrylic acid or a methacrylic acid; and (meth)acryloyl group means an acryloyl group or a methacryloyl group.

The alkyl (meth)acrylate where the alkyl group in the ester moiety has 1 to 18 carbon atoms includes methyl acrylate, methyl methacrylate, ethyl acrylate, ethyl methacrylate, propyl acrylate, propyl methacrylate, isopropyl acrylate, isopropyl methacrylate, n-butyl acrylate, n-butyl methacrylate, isobutyl acrylate, isobutyl methacrylate, n-hexyl acrylate, n-hexyl methacrylate, 2-ethylhexyl acrylate, 2-ethylhexyl methacrylate, lauryl acrylate, lauryl methacrylate, stearyl acrylate, stearyl methacrylate, etc. One of them may be used singly, or two or more thereof may be used in combination.

The crosslinking functional group-containing ethylenic monomer that is used optionally is an ethylenic monomer having in the molecule a functional group, for example, a hydroxyl group, a carboxyl group, an amino group, a substituted amino group, an epoxy group or the like, and preferably, a hydroxy group-containing ethylenic unsaturated compound and a carboxyl group-containing ethylenic unsaturated compound are used. Specific examples of such crosslinking functional group-containing ethylenic monomers include hydroxy group-containing (meth)acrylates such as 2-hydroxyethyl acrylate, 2-hydroxyethyl methacrylate, 2-hydroxypropyl acrylate, 2-hydroxypropyl methacrylate, 2-hydroxybutyl acrylate, 2-hydroxybutyl methacrylate, 4-hydroxybutyl acrylate, 4-hydroxybutyl methacrylate, etc.; carboxylic group-containing ethylenic unsaturated compounds such as acrylic acid, methacrylic acid, crotonic acid, maleic acid, itaconic acid, citraconic acid, etc. One of the above-mentioned crosslinking functional group-containing ethylenic monomers may be used singly, or two or more thereof may be used in combination.

The other optional monomer includes alicyclic structure-having (meth)acrylates such as cyclohexyl acrylate, cyclohexyl methacrylate, isobornyl acrylate, isobornyl methacrylate, etc.; vinyl esters such as vinyl acetate, vinyl propionate, etc.; olefins such as ethylene, propylene, isobutylene, etc.; olefin halides such as vinyl chloride, vinylidene chloride, etc.; styrenic monomers such as styrene, α-methylstyrene, etc.; dienic monomers such as butadiene, isoprene, chloroprene, etc.; nitrile monomers such as acrylonitrile, methacrylonitrile, etc.; N,N-dialkyl-substituted acrylamides such as N,N-dimethylacrylamide, N,N-dimethylmethacrylamide, etc. One of them may be used singly, or two or more thereof may be used in combination.

The above-mentioned (meth)acrylate, and the optional components, crosslinking functional group-containing ethylenic monomers and other monomers are used in a predetermined ratio, and copolymerized according to a conventional known method to produce (meth)acrylate copolymers having a weight-average molecular weight of preferably 300,000 to 1,500,000 or so, more preferably 350,000 to 1,300,000 or so.

The weight-average molecular weight is a standard polystyrene-equivalent value measured according to a gel permeation chromatography (GPC) method.

((Crosslinking Agent))

The acrylic resin may form a crosslinked structure using a crosslinking agent.

As the crosslinking agent, any one can be suitably selected and used from those heretofore generally used as a crosslinking agent for acrylic resins. Examples of such crosslinking agents include polyisocyanate compounds, epoxy compounds, melamine resins, urea resins, dialdehydes, methylol polymers, aziridine compounds, metal chelate compounds, metal alkoxides, metal salts, etc. In the case where the (meth)acrylate copolymer has a hydroxy group as the crosslinking functional group, a polyisocyanate compound is preferably used, while on the other hand, in the case where the copolymer has a carboxyl group, a metal chelate compound or an epoxy compound is preferred.

Examples of the polyisocyanate compound include aromatic polyisocyanates such as tolylene diisocyanate, diphenylmethane diisocyanate, xylylene diisocyanate, etc., aliphatic polyisocyanates such as hexamethylene diisocyanate, etc., alicyclic polyisocyanates such as isophorone diisocyanate, hydrogenated diphenylmethane diisocyanate, etc., and biuret forms and isocyanurate forms thereof, and further adduct forms that are reaction products with a low-molecular active hydrogen-containing compound such as ethylene glycol, propylene glycol, neopentyl glycol, trimethylolpropane, castor oil, etc. One of the above polyisocyanate compounds may be used singly, or two or more thereof may be used in combination.

Examples of the metal chelate compound include chelate compounds with a metal atom of aluminum, zirconium, titanium, zinc, iron, tin or the like. From the viewpoint of performance, an aluminum chelate compound is preferred.

Examples of the aluminum chelate compound include diisopropoxyaluminum monooleyl acetoacetate, monoisopropoxyaluminum bisoleyl acetoacetate, monoisopropoxyaluminum monooleate monoethyl acetoacetate, diisopropoxyaluminum monolauryl acetoacetate, diisopropoxyaluminum monostearyl acetoacetate, diisopropoxyaluminum monoisostearyl acetoacetate, monoisopropoxyaluminum mono-N-lauroyl-β-alanate monolaurylacetoacetate, aluminum tris acetylacetonate, monoacetylacetonate aluminum bis(isobutylacetoacetate) chelate, monoacetylacetonate aluminum bis(2-ethylhexylacetoacetate) chelate, monoacetylacetonate aluminum bis(dodecyl acetoacetate) chelate, monoacetylacetonate aluminum bis(oleyl acetoacetate) chelate, etc. One of the above metal chelate compounds may be used singly, or two or more thereof may be used in combination.

Examples of the epoxy compound include ethylene glycol diglycidyl ether, propylene glycol diglycidyl ether, diglycidyl terephthalate, spiroglycol diglycidyl ether, diglycidylaminomethylcyclohexane, tetraglycidylxylenediamine, tetraglycidylbisaminomethylcyclohexane, polyglycidylmetaxylenediamine, etc. One of the above epoxy compounds may be used singly, or two or more thereof may be used in combination.

The thickness of the second pressure sensitive adhesive layer (B2) is not specifically limited but is preferably 1 to 50 μm, more preferably 3 to 30 μm, even more preferably 5 to 20 μm.

To the pressure sensitive adhesive composition for use for the first pressure sensitive adhesive layer (B1) and the second pressure sensitive adhesive layer (B2), as needed, various additives of conventional known additives, for example, a filler, inorganic particles, organic particles, a weight-saving agent, a fluidizing agent, a pigment, a dye, a colorant, an antioxidant, a UV absorbent, a light stabilizer and the like may be added.

<Release Material (C)>

Examples of the release material (C) included in the pressure sensitive adhesive sheet for tires of the present invention includes a release sheet processed for lubrication on both sides, a release sheet processed for lubrication on one side, etc., and those prepared by applying a release agent onto a support for a release material and the like are usable.

Examples of the substrate for the release material include papers such as wood-free paper, glassine paper, kraft paper, etc.; plastic films such as polyester resin films of polyethylene terephthalate resin, polybutylene terephthalate resin, polyethylene naphthalate resin or the like, polyolefin resin films of polypropylene resin, polyethylene resin or the like, etc.

Examples of the release agent include rubber elastomers such as silicone resin, olefin resin, isoprene resin, butadiene resin etc., as well as long-chain alkyl resin, alkyd resin, fluororesin, etc.

The thickness of the release material (C) is not specifically limited so far as it does not detract from the advantageous effects of the present invention, but from the viewpoint of bettering the operability in continuously and efficiently sticking the labels produced using the pressure sensitive adhesive sheet of the present invention to tires using a labeling apparatus, the thickness is preferably 10 to 200 μm, more preferably 20 to 180 μm, even more preferably 30 to 150 μm.

[Production Method for Pressure Sensitive Adhesive Sheet for Tires]

The production method for the pressure sensitive adhesive sheet for tires of the present invention is not specifically limited, and any known method is employable for the production. For example, the pressure sensitive adhesive sheet may be produced according to the production method having the following steps (1) to (7).

Step (1): A step of producing a laminate (I) having a release material (C), a first pressure sensitive adhesive layer (B1), and a first substrate (A1), in this order.

Step (2): A step of producing a laminate (II) by forming a second pressure sensitive adhesive layer (B2) on a second substrate (A2).

Step (3): A step of forming a laminate (III) and a selvage part (Y1) by die cutting the laminate part (L) composed of the first pressure sensitive adhesive layer (B1) and the first substrate (A1) in the laminate (I) produced in the step (1).

Step (4): A step of removing the selvage part (Y1) formed in the step (3).

Step (5): A step of forming a laminate (IV) by sticking the second pressure sensitive adhesive layer (B2) of the laminate (II) produced in the step (2) to the first substrate (A1) of the laminate (III) via the step (4).

Step (6): A step of forming a laminate (V) and a selvage part (Y2) by die cutting the laminate (II) in such a manner that the outline of the first pressure sensitive adhesive layer (B1) exists inside the outline of the second substrate (A2) in a planar view of the laminate (IV).

Step (7): A step of removing the selvage part (Y2) formed in the step (6).

The release material (C), the first pressure sensitive adhesive layer (B1), the first substrate (A1), the second pressure sensitive adhesive layer (B2) and the second substrate (A2) for use in the production method for the pressure sensitive adhesive sheet for tires of the present invention are the same as those exemplified hereinabove for the constituent members of the pressure sensitive adhesive sheet for tires of the present invention, and the preferred embodiments thereof are also the same as those mentioned hereinabove.

Each step of production of the pressure sensitive adhesive sheet for tires of the present invention is described below.

<Step (1)>

The step (1) is a step of producing a laminate (I) having a release material (C), a first pressure sensitive adhesive layer (B1), and a first substrate (A1), in this order.

The production method for the laminate (I) is not specifically limited, and the laminate (I) can be produced by any known method. For example, the laminate may be produced as follows. (i) A pressure sensitive adhesive composition for forming a first pressure sensitive adhesive layer (B1) is applied onto a release material (C) to form a first pressure sensitive adhesive layer (B1), and thereafter this is stuck to a first substrate (A1), or (ii) a pressure sensitive adhesive composition for forming a first pressure sensitive adhesive layer (B1) is applied onto to a first substrate (A1) to form a first pressure sensitive adhesive layer (B1), and thereafter this is stuck to a release material (C); and according to any of these methods, a first laminate (I) can be produced.

For the coating method with a pressure sensitive adhesive composition to form the first pressure sensitive adhesive layer (B1), a known method is employable. For example, the above-mentioned pressure sensitive adhesive composition may be directly applied onto a release material (C) or a first substrate (A1) according to a known coating method to form a coating film thereon.

Examples of the coating method include a spin coating method, a spray coating method, a bar coating method, a knife coating method, a roll coating method, a blade coating method, a die coating method, a gravure coating method, etc. In addition, printing methods, for example, a gravure printing method, a screen printing method, an offset printing method, a flexographic printing method and the like are also employable.

<Step (2)>

The step (2) is a step of forming a second pressure sensitive adhesive layer (B2) on a second substrate (A2) to form a laminate (II).

As the coating method with a pressure sensitive adhesive composition to form the second pressure sensitive adhesive layer (B2), a known method is employable. For example, the above-mentioned pressure sensitive adhesive composition is directly applied onto a second substrate (A2) according to a known coating method to form a coating film. The coating method, for example is the same method as the coating method employable in the above-mentioned step (1).

<Step (3)>

The step (3) is a step of forming a laminate (III) and a selvage part (Y1) by die cutting the laminate part (L) composed of the first pressure sensitive adhesive layer (B1) and the first substrate (A1) in the laminate (I) produced in the step (1).

Figure 3:
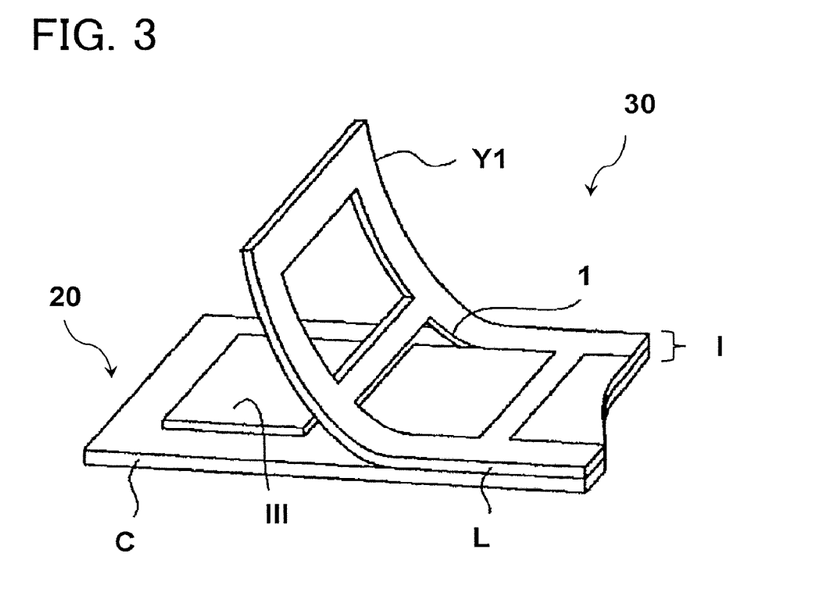
FIG. 3 is a schematic perspective view of a pressure sensitive adhesive sheet for tires after die cutting, for explaining a selvage part (Y1) and a laminate (III) to form during working.

Here, this is explained with reference to FIG. 3. A continuum 20 of laminates (III) having the laminates (III) on the release material (C) can be produced by die cutting process in which the laminate part (L) is cut from the surface side of the first substrate (A1) of the laminate (I) and cut 1 surrounding a predetermined part of the laminate part (L) is made. In FIG. 3, the laminate (I) after die cutting is shown by 30. Through the the cutting, laminates (III) each surrounded by the cut 1 and the selvage part (Y1) having both edges in the width direction except the laminates (III) are formed in the laminate part (L).

<Step (4)>

The step (4) is a step of removing the selvage part (Y1) formed in the step (3).

After the step (3), the selvage part (Y1) is peeled off and removed from the laminate (I) 30 after the die cutting, and the laminates (III) are left on the release material (C), and the a continuum of the laminates (III) 20 is transferred to the next step.

<Step (5)>

The step (5) is a step of forming a laminate (IV) by sticking the second pressure sensitive adhesive layer (B2) of the laminate (II) produced in the step (2) to the first substrate (A1) of the laminate (III) via the step (4).

For example, a method is employable where a previously-prepared roll of the laminate (II) is unrolled to give a long sheet of the laminate (II), and this is layered on the continuum of the laminates (III) 20 conveyed from a different line, and then the two are stuck together by a compact roll or the like.

<Step (6)>

The step (6) is a step of forming a laminate (V) and a selvage part (Y2) by die cutting the laminate (II) in such a manner that the outline of the first pressure sensitive adhesive layer (B1) exists inside the outline of the second substrate (A2) in a planar view of the laminate (IV).

Die cutting of the step (6) is explained, for example, with reference to FIG. 4. From the surface side of the second substrate (A2) of the laminate (II) in the laminate (IV), a cut 2 is made in such a manner that the outline of the first pressure sensitive adhesive layer (B1) exists inside the outline of the second substrate (A2) in a planar view of the second substrate (A2), and by die cutting in the condition, a continuum of the laminates (V) 40 that has the laminates (V) on the release material (C) is produced. In FIG. 4, a laminate (IV) 50 after die cutting is shown. In FIG. 4, the reference sign A2 is omitted. The surface on the second substrate (A2) side of the laminate (II) indicates the surface of the laminae (II) on the side opposite to the release material (C). By the die cutting, the laminates (V) each surrounded by the cut 2 and the selvage part (Y2) having both edges in the width direction except the laminates (V) are formed on the release material (C).

In die cutting in the step (6), preferably, the second substrate (A2) is cut in such a manner that the shortest distance (Z) between the outline b1 of the first pressure sensitive adhesive layer (B1) and the outline a2 of the second substrate (A2) in a planar view of the second substrate (A2) is 0.10 mm or more. The shortest distance (Z) is more preferably 0.20 mm or more, even more preferably 0.30 mm or more, still more preferably 0.50 mm or more. The upper limit is not specifically limited, but is preferably 10.00 mm or less, more preferably 5.00 mm or less, even more preferably 3.00 mm or less, still more preferably 2.00 mm or less.

In die cutting in the step (6), preferably, the second substrate (A2) is cut in such a manner that the shortest distance (Z2) between the cutting position in die cutting in the step (6) and the cutting position in cutting in the step (3) [the outline of the first pressure sensitive adhesive layer (B1) just after the die cutting in the step (3)], in a planar view of the second substrate (A2), is 0.40 mm or more. The shortest distance (Z2) is more preferably 0.50 mm or more, even more preferably 0.60 mm or more. The upper limit is not specifically limited, but is preferably 10.00 mm or less, more preferably 5.00 mm or less, even more preferably 3.00 mm or less, still more preferably 2.00 mm or less.

<Step (7)>

The step (7) is a step of removing the selvage part (Y2) formed in the step (6).

After the step (6), the selvage part (Y2) is peeled off and removed from the laminate after the die cutting, that is, from the pressure sensitive adhesive sheet for tires, and on the release material (C), the laminates (V) are left, and a continuum of labels of the remaining laminates (V) is thus obtained.

The continuum of labels is used as labels with trade names or the like printed thereon. In a pre-step or a post-step before or after the die cutting step (6), the top surface of the second substrate (A2) of each laminate (V) is printed using a printer to give printed labels.

[Method of Using Pressure Sensitive Adhesive Sheet for Tires]

The pressure sensitive adhesive sheet for tires of the present invention is, as described above, worked into a continuum of labels, and then stuck to the surfaces of tires using a labeling apparatus.

Figure 5:
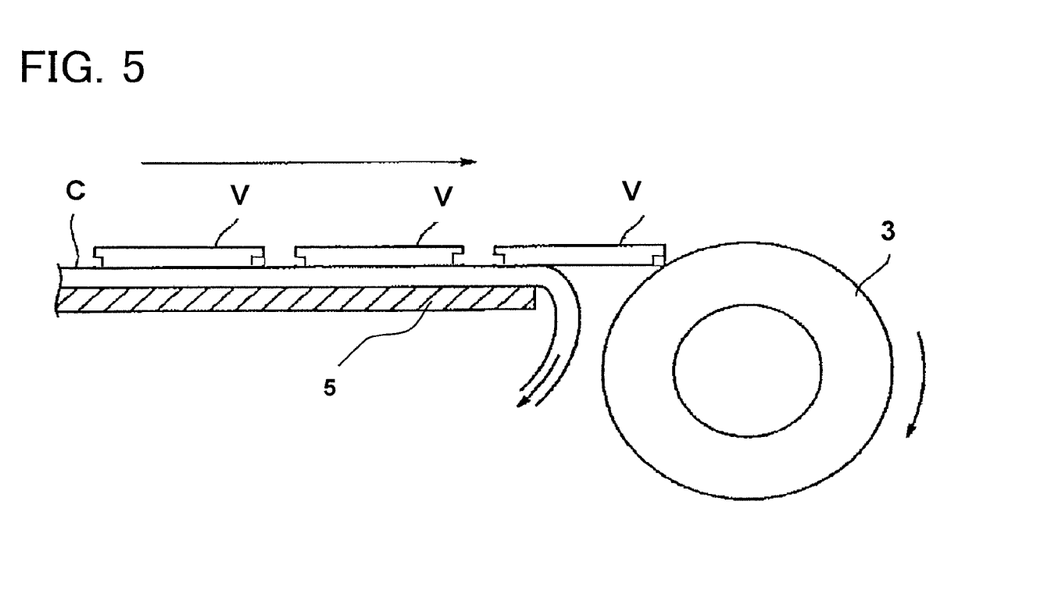
FIG. 5 is a schematic view showing one example of a process of labeling on tires, in which a label formed from a pressure sensitive adhesive sheet for tires of the present invention is stuck to a tire.

One example of a labeling apparatus is shown in FIG. 5. A long strip-like pressure sensitive adhesive sheet for tires having laminates (V) that are printed labels thereon is conveyed in the lengthwise direction, that is, in the right-hand direction in FIG. 5. Before the tire 3 as an adherend, the release material (C) is wound downwardly, but the laminate (V) that is a label part is, at that time, peeled from the release material (C) and is extruded forwardly (in the right-hand direction in FIG. 5) and is thus stuck to the tire 3. The tire 3 rotates in the arrowed direction in FIG. 5, and the laminate (V) that is the extruded label part is stuck to the tire 3. This operation is repeated continuously, and labels are thus stuck to tires (not shown) coming one after another.

Figure 6:
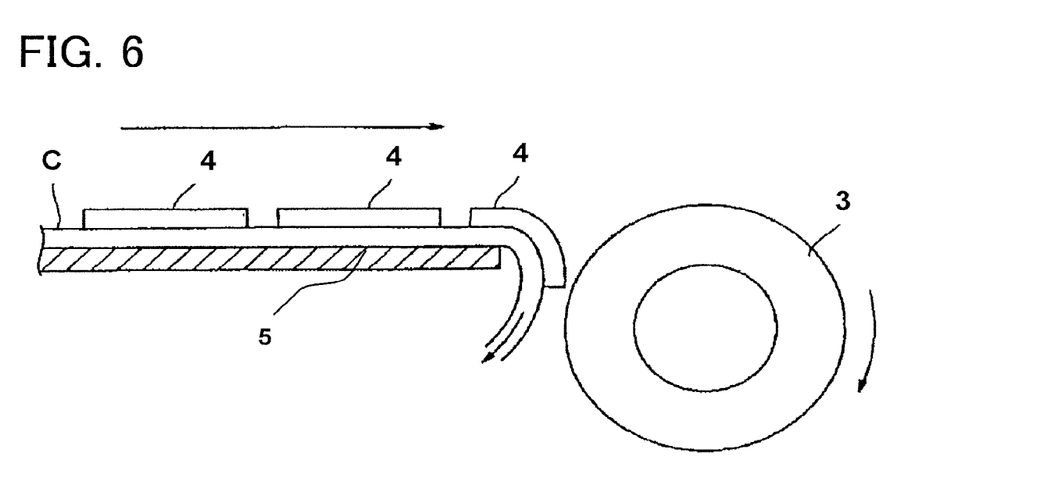
FIG. 6 is a schematic view showing one example of a trouble to occur in a process of labeling on tires a label formed from a pressure sensitive adhesive sheet for tires that differs from the present invention.

For example, in the case where a pressure sensitive adhesive sheet for tires of an embodiment of Comparative Example 1 to be mentioned below is used and where the label part 4 is not smoothly peeled away from the release material (C) at the time when the release material (C) is wound downwardly, the label part 4 is also wound in the downward direction of FIG. 6 along with the release material (C), as shown in FIG. 6, with the result that not only the label part 4 is not be stuck to the tire 3 but also the apparatus must be shut down, therefore causing productivity reduction and worsening of operability.

Consequently, when the release material (C) is wound downwardly, the label part 4 must be smoothly peeled away from the release material (C) and pushed forwardly.

EXAMPLES

The present invention is described in more detail with reference to the following Examples, but the present invention is not restricted by these Examples.

The measurement methods and the evaluation methods employed in the present invention are described below.

[Measurement Methods]

<Thickness of Each Layer and Substrate>

The thickness of each layer was measured using a constant-pressure thickness gauge (trade name "PG-02" manufactured by TECLOCK Corporation) according to JIS K 7130.

<MD Stiffness of Second Substrate (A2)>

The second substrate (A2) used in Examples and Comparative Examples was prepared, and according to the Gurley method according to JIS L 1085, the second substrate (A2) was measured in the machine direction (MD). The test piece prepared for use for the measurement has a size of 38 mm in length and 25 mm in width. The test piece in the MD direction means that the lengthwise direction of the test piece is the MD direction of the second substrate (A2).

<Measurement of Shortest Distance (Z) Between Outline of Second Substrate (A2) and Outline of First Pressure Sensitive Adhesive Layer (B1)>

The shortest distance (Z) was measured using a caliper.

<Measurement of Minimum Height H1, Shortest Distance from Surface Edge of Second Pressure Sensitive Adhesive Layer (B2) Opposite to Second Substrate (A2) to Release Material (C)>

The distance of the shortest height h1 was measured using a clearance gauge according to JIS K 7524:2008.

[Practical Use Test]

A pressure sensitive adhesive sheet for tires was worked into a continuum of labels, then wound up into a roll, stored in an environment at 40° C. for 7 days, and then set on a labeling apparatus. This was unrolled out of the labeling apparatus at a speed of 12 m/min for placing 100 labels on tires, and tested and evaluated in point of the following matters.

<Adhering of Pressure Sensitive Adhesive Composition to Back Surface of Release Material (C)>

During unrolling, the back surface of the release material (C) was visually checked for presence or absence of a deposit of the pressure sensitive adhesive composition adhering thereto.

A: A deposit of the pressure sensitive adhesive composition adhering to the back surface of the release material (C) was not confirmed.

B: Only a little deposit of the pressure sensitive adhesive composition adhering to the back surface of the release material (C) was confirmed, but was on a level not having any influence on the unrolling operation.

C: Much deposit of the pressure sensitive adhesive composition adhering to the back surface of the release material (C) formed, and unrolling was impossible.

<Label Edge Peeling>

Possibility of label edge peeling in labeling operation was confirmed. The tested samples were evaluated according to the following criteria.

A: All labels succeeded in edge peeling in every labeling operation.

B: Only 1 to 4 labels failed in edge peeling and were wound up along with the release material.

C: 5 or more labels failed in edge peeling and were wound up along with the release material.

Example 1

<Production of Pressure Sensitive Adhesive Sheet 1 for Tires>

<<Preparation of Pressure Sensitive Adhesive Composition 1>>

As a block copolymer, 21.2 parts by mass of SIS (trade name "Kraton D-1112" manufactured by Kraton Corporation, diblock amount: 40% by mass, polystyrene region content: 15% by mass); as tackifiers, 46.5 parts by mass "T-480X" (trade name, manufactured by Mitsui Chemical Corporation, softening point: 80° C., aliphatic/aromatic copolymer petroleum resin), and 10.1 parts by mass of "Pensel™ D-160" (trade name by Arakawa Chemical Industries, Ltd., softening point: 160° C., polymerized rosin ester); as a plasticize, 21.2 parts by mass of "Pureflex SNH-100SP" (trade name, manufactured by Sankyo Yuka Kogyo KK, paraffinic oil process); and as an antioxidant, 1 part by mass of "Irganox™ 1010 (trade name, manufactured by BASF, hindered phenol-type antioxidant) were uniformly mixed to prepare a pressure sensitive adhesive composition 1.

<<Preparation of Pressure Sensitive Adhesive Composition 2>>

100 parts by mass of an acrylate copolymer (an ethyl acetate solution containing a copolymer and having a solid content of 30% by mass, obtained by copolymerizing 95% by mass of butyl acrylate and 5% by mass of acrylic acid), and 0.5 parts by mass of an isocyanate-type crosslinking agent (trade name "Coronate™ L by Tosoh Corporation) were uniformly mixed to prepare a pressure sensitive adhesive composition 2.

<<Step (1)>>

As a release material (C), SP-8E Ivory (by Lintec Corporation) was prepared.

The pressure sensitive adhesive composition 1 was melted under a condition of 140° C., and applied onto the release material (C) to form a first pressure sensitive adhesive layer (B1) so that the coating thickness was 50 using a die coater.

Next, as a first substrate (A1), a polyethylene terephthalate film (trade name Lumirror™ by Toray Industries, Inc., thickness 25 µm) was prepared, and this was stuck to the first pressure sensitive adhesive layer (B1) on the release material (C) to produce a laminate (I).

<<Step (2)>>

As a second substrate (A2), a polyethylene terephthalate film (trade name Lumirror™ by Toray Industries, Inc., thickness 50 µm) was prepared.

Using a die coater, the pressure sensitive adhesive composition 2 was applied onto the second substrate (A2) to form thereon a second pressure sensitive adhesive layer (B2) in such a manner that the coating thickness was 10 µm, thereby producing a laminate (II).

<<Step (3)>>

Next, in the resultant laminate (I), the laminate part (L) except the release material (C) was cut into a size of 100.0 mm in length×50.0 mm in width, thereby forming laminates (III) and a selvage part (Y1).

<<Step (4)>>

The selvage part (Y1) formed in the step (3) was removed by stripping.

<<Step (5)>>

The second pressure sensitive adhesive layer (B2) of the laminate (II) produced in the step (2) and the first substrate (A1) of the laminate (III) via the step (4) were stuck together to produce a laminate (IV).

<<Step (6)>>

Next, the second substrate (A2) was cut into a size of 101.2 mm in length×51.2 mm in width in such a manner that, in a planar view of the second substrate (A2), the outline of the first pressure sensitive adhesive layer (B1) was inside the outline of the second substrate (A2), thereby forming a laminate (V) and a selvage part (Y2).

<<Step (7)>>

The selvage part (Y2) formed in the step (6) was removed by stripping to produce a pressure sensitive adhesive sheet 1 for tires.

Example 2

A pressure sensitive adhesive sheet 2 for tires was produced in the same manner as in Example 1, except that a polyethylene terephthalate film (trade name "Lumirror™ by Toray Industries, Inc., thickness 38 μm) was used as the second substrate (A2).

Example 3

A pressure sensitive adhesive sheet 3 for tires was produced in the same manner as in Example 1, except that a polyethylene terephthalate film (trade name "Lumirror™ by Toray Industries, Inc., thickness 25 μm) was used as the second substrate (A2) and further, the size of the second substrate (A2) in the step (6) was 108.0 mm in length×58.0 mm in width.

Comparative Example 1

A pressure sensitive adhesive sheet 4 for tires was produced in the same manner as in Example 1, except that in the cutting in the step (6), the second substrate (A2) was cut to a size of 100.0 mm in length×50.0 mm in width so that the outline of the second substrate (A2) was the same as the outline of the first pressure sensitive adhesive layer (B1).

Comparative Example 2

A pressure sensitive adhesive sheet 5 for tires was produced in the same manner as in Example 1, except that a polyethylene terephthalate film (trade name "Lumirror™ by Toray Industries, Inc., thickness 12 μm) was used as the second substrate (A2).

Table 1 shows that the pressure sensitive adhesive sheets for tires produced in Examples 1 to 3 all gave good results in every test of adhering of the pressure sensitive adhesive to the release layer (C) and label edge peeling.

On the other hand, in the pressure sensitive adhesive sheet for tires produced in Comparative Example 1, the outline b1 of the relatively soft, first pressure sensitive adhesive layer (B1) oozed out from the outline a2 of the second substrate (A2) after working, thereby the pressure sensitive adhesive transferred to the surface on the opposite side to the label of the release material (C).

Since the pressure sensitive adhesive sheet for tires produced in Comparative Example 2 had a stiffness of less than 0.10 mN, label edge peeling failure occurred.

INDUSTRIAL APPLICABILITY

The continuum of labels produced from the pressure sensitive adhesive sheet for tires of the present invention is excellent in workability in labeling operation using a labeling apparatus, and can be therefore continuously and efficiently stuck to tires using a labeling apparatus.

REFERENCE SIGNS LIST

A1 First Substrate (A1)
A2 Second Substrate (A2)
B1 First Pressure Sensitive Adhesive Layer (B1)
B2 Second Pressure Sensitive Adhesive Layer (B2)
C Release Material (C)
h1 Shortest distance from edge of surface of second pressure sensitive adhesive layer
 (B2) on opposite side to second substrate (A2) to release material (C)
a2 Outline of Second Substrate (A2)
b1 Outline of First Pressure Sensitive Adhesive Layer (B1)
Z Shortest distance between outline of second substrate (A2) and outline of first pressure sensitive adhesive layer (B1)
I Laminate (I)
II Laminate (II)
III Laminate (III)
IV Laminate (IV)
V Laminate (V)
L Laminate Part (L)
Y1 Selvage Part (Y1)
Y2 Selvage Part (Y2)

TABLE 1

| | Characteristics of Pressure Sensitive Adhesive Sheet for Tires and Constituent Members | | | Practical Use Test | |
|---|---|---|---|---|---|
| | Requirement (I) [—] | Shortest Distance (Z) [mm] | MD Stiffness of Second Substrate (A2) [mN] | Minimum Height h1 [mm] | Adhering of Pressure Sensitive Adhesive to Back Surface of Release Material (C) [—] | Label Edge Peeling[1] [—] |
| Example 1 | yes | 0.30 | 0.20 | 0.07 | A | A |
| Example 2 | yes | 0.30 | 0.15 | 0.06 | A | A |
| Example 3 | yes | 3.70 | 0.10 | 0 | A | B |
| Comparative Example 1 | no | n.d.[2] | 0.20 | 0.07 | C | C |
| Comparative Example 2 | yes | 0.30 | 0.01 | 0 | A | C |

[1]Possibility of edge peeling in unrolling from labeling apparatus.
[2]Not detected. A part of the outline b1 of the first pressure sensitive adhesive oozed out from the outline a2 of the second substrate (A2).

1, 2 Cut
3 Tire
4 Label
5 Peel Plate
10 Pressure Sensitive Adhesive Sheet for Tires
20 Continuum of Laminates (III)
30 Laminate (I) after Die cutting
40 Continuum of Laminates (V)
50 Laminate (IV) after Die cutting

What is claimed is:

1. A pressure sensitive adhesive sheet for tires, comprising:
   a release material (C);
   a first pressure sensitive adhesive layer (B1);
   a first substrate (A1);
   a second pressure sensitive adhesive layer (B2); and
   a second substrate (A2),
   wherein the release material (C), the first and second pressure sensitive adhesive layers (B1, B2), and the first and second substrates (A1, A2) are in an order of the release material (C), the first pressure sensitive adhesive layer (B1), the first substrate (A1), the second pressure sensitive adhesive layer (B2), and the second substrate (A2),
   the second substrate (A2) is a resin film comprising a thermoplastic resin, where the thermoplastic resin consists of at least one selected from the group consisting of polypropylene, polyethylene terephthalate, polybutylene terephthalate, polyethylene naphthalate, polystyrene, and nylon, or is a synthetic paper,
   in a planar view of the pressure sensitive adhesive sheet, an outline of the first pressure sensitive adhesive layer (B1) exists inside an outline of the second substrate (A2), and
   a MD stiffness of the second substrate (A2), measured in the Gurley method according to JIS L 1085, is 0.10 mN or more.

2. The pressure sensitive adhesive sheet for tires according to claim 1,
   wherein a minimum height h1, that is a shortest distance from an edge of a surface of the second pressure sensitive adhesive layer (B2) on an opposite side with respect to the second substrate (A2) to the release material (C), is more than 0 mm.

3. The pressure sensitive adhesive sheet for tires according to claim 2, wherein the minimum height h1 is from 0.03 mm to 2.00 mm.

4. The pressure sensitive adhesive sheet for tires according to claim 2, wherein the minimum height h1 is from 0.04 mm to 1.00 mm.

5. The pressure sensitive adhesive sheet for tires according to claim 1, wherein the first pressure sensitive adhesive layer (B1) is formed of a hot-melt pressure sensitive adhesive composition.

6. The pressure sensitive adhesive sheet for tires according to claim 5, wherein the hot-melt pressure sensitive adhesive composition comprises 15 to 40% by mass of a block copolymer, 30 to 70% by mass of a tackifier, and 10 to 40% by mass of a plasticizer.

7. The pressure sensitive adhesive sheet for tires according to claim 5, wherein the hot-melt pressure sensitive adhesive composition comprises 15 to 30% by mass of a block copolymer, 30 to 70% by mass of a tackifier, and 10 to 40% by mass of a plasticizer.

8. The pressure sensitive adhesive sheet for tires according to claim 1, wherein the MD stiffness of the second substrate (A2), measured in the Gurley method according to JIS L 1085, is from 0.10 mN to 0.40 mN.

9. The pressure sensitive adhesive sheet for tires according to claim 1, wherein the MD stiffness of the second substrate (A2), measured in the Gurley method according to JIS L 1085, is from 0.10 mN to 0.20 mN.

10. A pressure sensitive adhesive sheet for tires, comprising:
    a release material (C);
    a first pressure sensitive adhesive layer (B1);
    a first substrate (A1);
    a second pressure sensitive adhesive layer (B2); and
    a second substrate (A2),
    wherein the release material (C), the first and second pressure sensitive adhesive layers (B1, B2), and the first and second substrates (A1, A2) are in an order of the release material (C), the first pressure sensitive adhesive layer (B1), the first substrate (A1), the second pressure sensitive adhesive layer (B2), and the second substrate (A2),
    the second substrate (A2) is free of polyethylene,
    in a planar view of the pressure sensitive adhesive sheet, an outline of the first pressure sensitive adhesive layer (B1) exists inside an outline of the second substrate (A2), and
    a MD stiffness of the second substrate (A2), measured in the Gurley method according to JIS L 1085, is 0.10 mN or more.

11. The pressure sensitive adhesive sheet for tires according to claim 10, wherein a minimum height h1, that is a shortest distance from an edge of a surface of the second pressure sensitive adhesive layer (B2) on an opposite side with respect to the second substrate (A2) to the release material (C), is more than 0 mm.

12. The pressure sensitive adhesive sheet for tires according to claim 11, wherein the minimum height h1 is from 0.03 mm to 2.00 mm.

13. The pressure sensitive adhesive sheet for tires according to claim 11, wherein the minimum height h1 is from 0.04 mm to 1.00 mm.

14. The pressure sensitive adhesive sheet for tires according to claim 10, wherein the first pressure sensitive adhesive layer (B1) is formed of a hot-melt pressure sensitive adhesive composition.

15. The pressure sensitive adhesive sheet for tires according to claim 14, wherein the hot-melt pressure sensitive adhesive composition comprises 15 to 40% by mass of a block copolymer, 30 to 70% by mass of a tackifier, and 10 to 40% by mass of a plasticizer.

16. The pressure sensitive adhesive sheet for tires according to claim 14, wherein the hot-melt pressure sensitive adhesive composition comprises 15 to 30% by mass of a block copolymer, 30 to 70% by mass of a tackifier, and 10 to 40% by mass of a plasticizer.

17. The pressure sensitive adhesive sheet for tires according to claim 10, wherein the MD stiffness of the second substrate (A2), measured in the Gurley method according to JIS L 1085, is from 0.10 mN to 0.40 mN.

18. The pressure sensitive adhesive sheet for tires according to claim 10, wherein the MD stiffness of the second substrate (A2), measured in the Gurley method according to JIS L 1085, is from 0.10 mN to 0.20 mN.

* * * * *